No. 757,136.

Patented April 12, 1904.

UNITED STATES PATENT OFFICE.

MARTIN MOEST, OF HÖCHST-ON-THE-MAIN, GERMANY, ASSIGNOR TO FARBWERKE, VORM. MEISTER, LUCIUS & BRÜNING, OF HÖCHST-ON-THE-MAIN, GERMANY, A CORPORATION.

OXIDIZING ORGANIC COMPOUNDS.

SPECIFICATION forming part of Letters Patent No. 757,136, dated April 12, 1904.

Application filed September 4, 1902. Serial No. 122,126. (No specimens.)

*To all whom it may concern:*

Be it known that I, MARTIN MOEST, Ph. D., a citizen of the Empire of Germany, residing at Höchst-on-the-Main, Germany, have invented certain new and useful Improvements in Oxidizing Organic Compounds, of which the following is a specification.

The oxids of cerium derived therefrom have hitherto not been used to oxidize organic substances, yet it is known that, for instance, ceric salts are used in the manufacture of anilin-black. (*Dingler's Polyt. Journ.*, 212, 1874/349.) In this case, however, the cerium merely acts as the carrier of oxygen in a manner little elucidated up till now. (Schultz, *Chemie d. Steinkohlentheers*, 3 Aufl.) It is further described in literature that ceric salts are reduced by nitric acid on addition of alcohol (Gmelin-Kraut, *Handbuch*, II, 1, 1886/508) to cerous salts, when the solution becomes discolored. I have found that cerite oxids and cerite salts are powerful oxidizing agents, which not only oxidize so-called "reducing" agents, but which are equal in strength to chromic acid and potassium permanganate and may be used with advantage as a substitute in many respects.

In oxidizing organic substances by means of cerium compounds two methods may be employed. The cerium compounds to be considered as capable of oxidizing organic substances are: cerium dioxid, the so-called "cerite" oxids, (a mixture of oxids of rare metals,) and the salts derived therefrom. The cerium dioxid or the cerite oxids are used in the form of a fine brown powder containing about sixty to seventy per cent. of $CeO_2$. It may be obtained cheaply and in unlimited quantity by heating in the air from the worthless by-products in the manufacture of mantles. The contents of neodym, and especially praseodym, in these oxids is rather of advantage than injurious. The cerium dioxid is particularly distinguished from all other similar oxidizing agents that it may easily be obtained or regenerated from its compounds by heating in the air. Thus by heating cerium sulfates in a current of air cerium dioxid and sulfuric-acid anhydrid are obtained.

It is particularly remarkable that the cerite oxids, or $CeO_2$, which by themselves are difficultly or hardly soluble in acids, may readily be transformed into cerous salts by acid in the presence of even little oxidizable organic substances and at a relatively low temperature. As to the reaction of cerite oxids the process may be illustrated by the following example: A flask provided with an agitator and reflux condenser contains one liter of sulfuric acid of sixty-per-cent. strength and thirty grams of toluene. The mixture is heated to about 60° centigrade, two hundred grams of cerium dioxid or its hydrate $CeO_2 H_2O$ of sixty-seven-per-cent. strength being added in small portions at this temperature while stirring. When all cerium dioxid is introduced, the temperature is slowly raised to about 90° centigrade. The reaction is complete when the brown cerite oxids are transformed into white sulfate. The products of oxidation thus formed and the still unchanged toluene are then distilled with steam. The toluene may be separated from the benzaldehyde formed by fractional distillation. Tolylphenylmethane and anthraquinone are also obtained in small quantities. The manufacture of meta-tolylaldehyde from meta-xylol is quite similar.

It is understood that the proportions given in the examples may vary within wide limits, and pure $CeO_2$ may be used for cerite oxid.

The oxidation by means of ceric salts is illustrated by the following examples:

1. An aqueous solution which contains in four liters eight hundred grams of sulfuric acid and two hundred grams of ceric sulfate is heated to about 60° centigrade, whereupon the calculated quantity of anthracene is slowly introduced with stirring and the temperature is gradually raised to about 95° centigrade. After a short time the whole of the anthracene is changed into anthraquinone and the cerium solution has become colorless. The anthraquinone is filtered and washed and is ready to be further worked up.

2. Into a solution containing fifteen to twenty per cent. of sulfuric acid and three to five per cent. of ceric sulfate naphthalene is introduced and the whole is gradually heated. According to the concentration of the acid and the quantity of cerium salt, the reaction begins at 45° to 60° centigrade, which temperature it is preferable to maintain. The reaction is complete when the cerium-sulfate solution has become completely colorless. Besides some unchanged naphthalene, naphthoquinone and phthalic acid are obtained, which are isolated in the usual manner.

3. The oxidation is more energetic if in the above examples a more concentrated sulfuric acid is employed. If, for instance, cerium dioxid or ceric sulfate is introduced into a suspension of anthracene in concentrated sulfuric acid, then an energetic reaction occurs already at about 25° centigrade. The mass assumes a dark color, while spontaneously evolving heat, and finally carbonizes, much sulfurous acid escaping thereby. The reaction may be modified at will by changing the concentration of the acid and by regulating the temperature correspondingly.

In the above-cited examples other ceric salts may be used for ceric sulfate—for instance, ceric nitrate, ceric ammonia-nitrate, &c.—an addition of sulfuric acid not being then absolutely necessary.

For the hydrocarbons mentioned in the above examples may be substituted their well-known readily-oxidizable substitution products—such as, for instance, their nitro, nitroso, sulfonic, oxy, and halogen substitution products.

The temperature, the proportions of quantity, and current in the above-given examples may vary within wide limits.

Having thus described my invention, I claim—

1. The herein-described process for oxidizing aromatic hydrocarbons and their substitution products, which consists in causing ceric compounds to act on said aromatic compounds, substantially as set forth.

2. The herein-described process for oxidizing aromatic hydrocarbons and their substitution products, which consists in causing the oxids of the cerite gr up to act on said oxy compounds in presence of acids, substantially as set forth.

3. The herein-described process for oxidizing aromatic hydrocarbons and their substitution products, which consists in causing ceric salts to act on said organic compounds, substantially as set forth.

In testimony that I claim the foregoing as my invention I have signed my name in presence of two subscribing witnesses.

MARTIN MOEST.

Witnesses:
ALFRED BRISBOIS,
BERNHARD LEYDECKER.